June 7, 1927.  
C. M. STEVENSON  
OPHTHALMIC TEST LENS FRAME  
Filed July 11, 1922

INVENTOR.  
Clarence M. Stevenson  
BY  
his ATTORNEY

June 7, 1927.
C. M. STEVENSON
1,631,559
OPHTHALMIC TEST LENS FRAME
Filed July 11, 1922
3 Sheets-Sheet 2
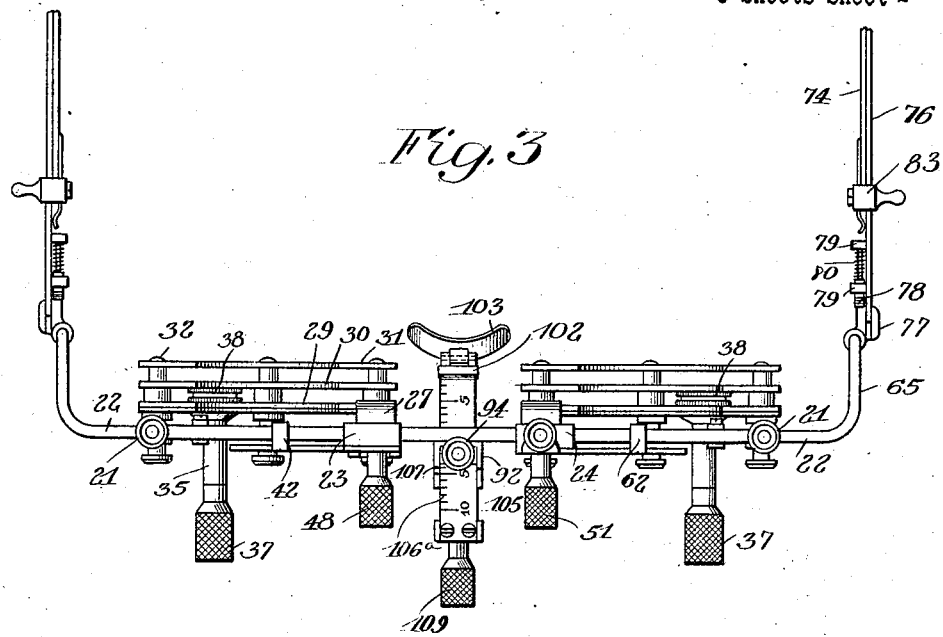
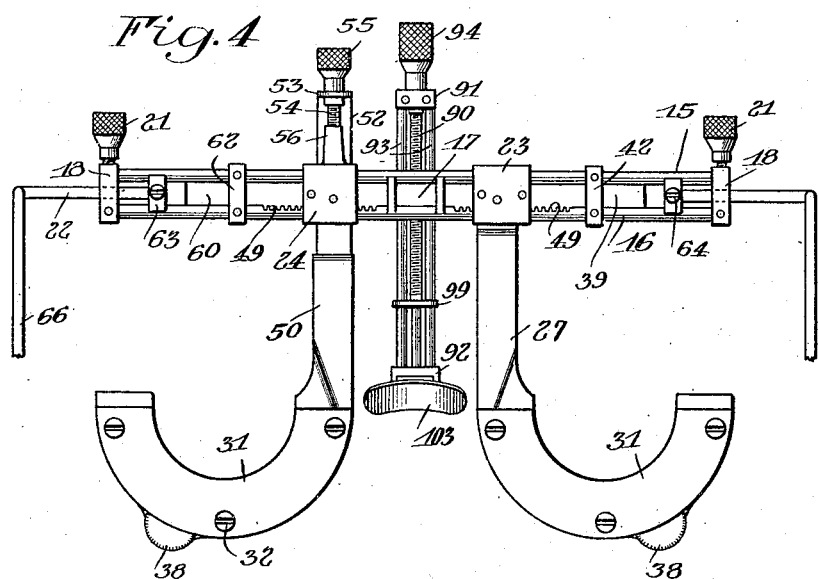
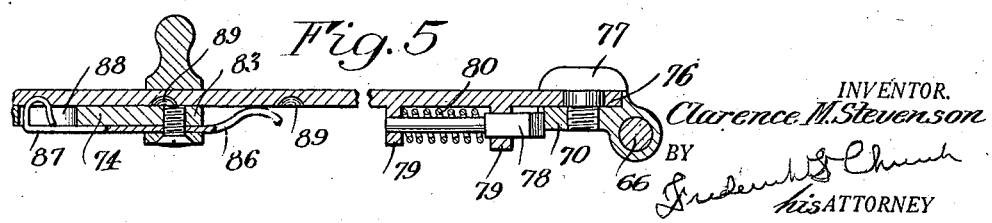
INVENTOR.
Clarence M. Stevenson
BY
his ATTORNEY June 7, 1927.
C. M. STEVENSON
OPHTHALMIC TEST LENS FRAME
Filed July 11, 1922
1,631,559
3 Sheets-Sheet 3
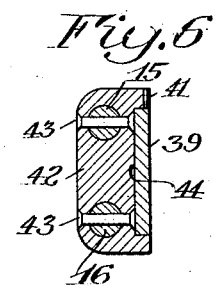
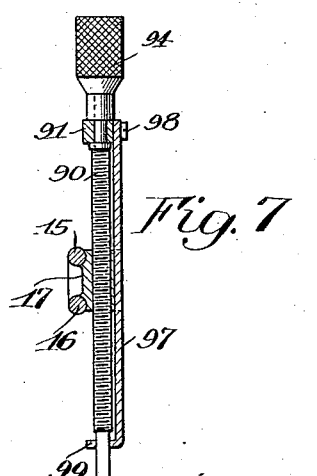
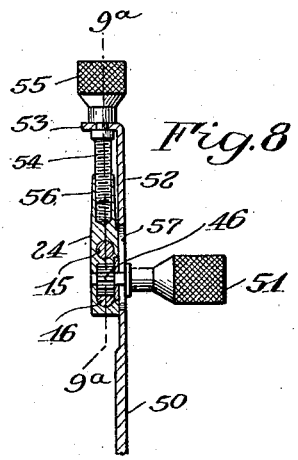
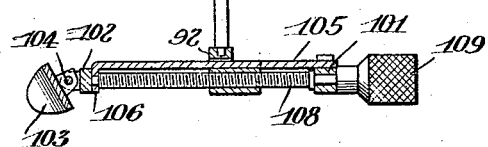
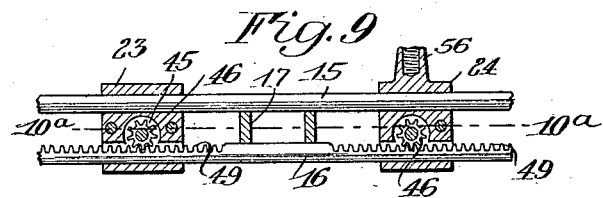
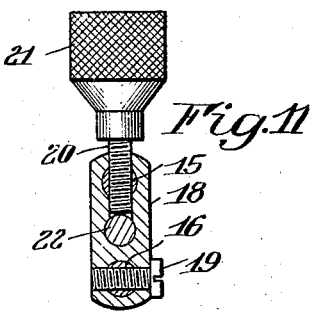
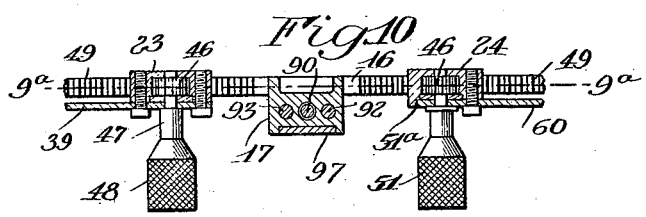
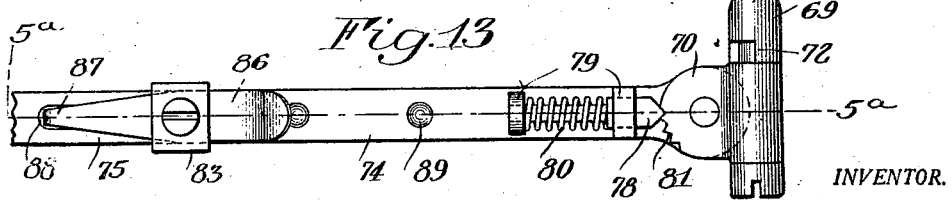
INVENTOR.
Clarence M. Stevenson
BY
his ATTORNEY Patented June 7, 1927.

1,631,559

UNITED STATES PATENT OFFICE.

CLARENCE M. STEVENSON, OF LOS ANGELES, CALIFORNIA, ASSIGNOR TO BAUSCH & LOMB OPTICAL COMPANY, OF ROCHESTER, NEW YORK, A CORPORATION OF NEW YORK.

OPHTHALMIC TEST-LENS FRAME.

Application filed July 11, 1922. Serial No. 574,207.

This invention relates to apparatus for testing the refraction of a patient's eyes and indicating the data required for fitting glasses and more particularly to frame means applicable to the patient's head for interchangeably supporting trial lenses in proper positions before the eyes. The chief object of the invention is to provide efficient frame means of the above character fully and readily adjustable to suit the physical conformation of a patient and embodied in a simple form of construction which is light in weight, convenient to adjust and capable of being economically manufactured. To these and other ends the invention resides in certain improvements and combinations of parts all as will hereinafter be more fully described, the novel features being pointed out in the claims at the end of the specification.

In the drawings:

Figure 3 is a top plan view partly broken away;

Figure 4 is a rear elevation partly broken away;

Figure 5 is an enlarged sectional view, partly broken away, of one of the temple bows taken on the line 5<sup>a</sup>—5<sup>a</sup> of Figure 13;

Figure 6 is an enlarged sectional detailed view on the line 6<sup>a</sup>—6<sup>a</sup> of Figure 1;

Figure 7 is a sectional view through the nosepiece and associated parts taken on the line 7<sup>a</sup>—7<sup>a</sup> of Figure 1;

Figure 8 is a sectional view on the line 8<sup>a</sup>—8<sup>a</sup> of Figure 1;

Figure 9 is a sectional view on the line 9<sup>a</sup>—9<sup>a</sup> of Figure 10 showing a portion of the means for supporting and adjusting the lens pockets;

Figure 10 is a sectional view on the line 10<sup>a</sup>—10<sup>a</sup> Figure 1;

Figure 11 is a sectional detailed view on the line 11<sup>a</sup>—11<sup>a</sup> Figure 1;

Figure 12 is a similar view on the line 12<sup>a</sup>—12<sup>a</sup> Figure 1; and Figure 13 is an enlarged elevation of the inner side of one of the temple bows.

Similar reference numerals throughout the several views indicated the same parts.

This invention comprises a trial lens frame of the character described having a bridge portion adjustably supported by a nosepiece and temple means and adjustably carrying the lens pockets. The bridge is preferably formed by a pair of spaced parallel members or bars 15 and 16, Figures 1 and 4, which are in the present instance in the form of round rods or wire. These frame members are maintained in proper spaced relation by a central tie member 17 and by tie members 18 connecting their outer ends. The central tie member 17 is generally of a rectangular, block-like shape and may be made as a casting, being rigidly fixed in any suitable manner at its upper and lower rear edges to the members 15 and 16 respectively. The main portion of member 17 projects forwardly of the plane of the members 15 and 16 and provides bearing means for adjustably supporting a nosepiece as hereinafter described.

Figure 1:
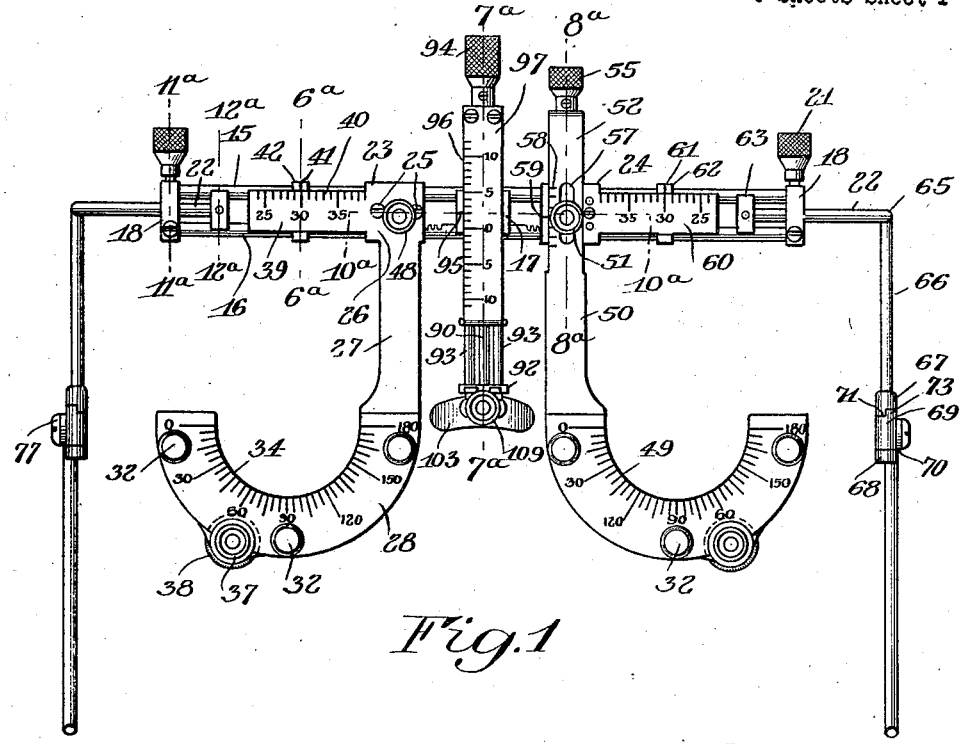
Figure 1 is a front elevation of an ophthalmic test lens frame embodying the present invention.

The end tie members 18, as shown in Figures 1 and 11, have the general form of short bars bored adjacent either end to receive the ends of the members 15 and 16 which latter preferably terminate flush with the outer side of each member 18. The ends of member 16 are preferably fixed in the bores in members 18 as by means of a small screw 19 passed therethrough and through member 16. The upper ends of members 18 preferably have threaded openings drilled downwardly therein through the ends of member 15 in which openings are received screws 20 having convenient finger-pieces 21 and arranged to be brought at their lower ends into clamping relation with a temple piece or bar 22 slidably received in a transverse opening adjacent the center of member 18, as more fully described hereafter. It is apparent from the above description that the bridge members 15 and 16 are rigidly connected together and adapted to serve as guide members for a plurality of cross-heads sliding therebetween along the bridge laterally of the frame for adjustably supporting the lens pockets and the temple pieces as described hereafter.

Figure 2:
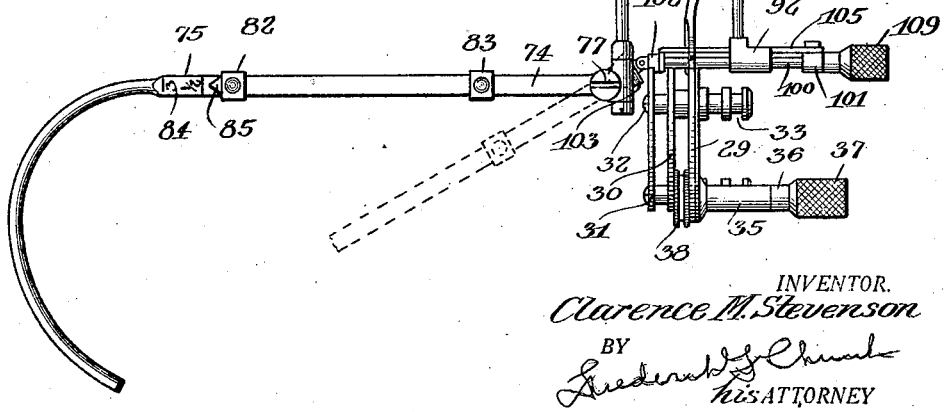
Figure 2 is a side elevation of the same showing in dotted lines a different position to which the temple bows may be adjusted.

The means for suporting the lens pockets comprises cross-heads 23 and 24, Figures 3, 4, 9 and 10, preferably in the form of rectangular blocks provided with spaced bores or bearings slidably receiving the members 15 and 16, so that each head is slidable laterally along the bridge toward and from the central member 17. Secured to the forward face of the head 23, as by means of screws 25, is an angular plate 26 of relatively light though rigid form having a depending arm 27 supporting one of the lens pockets 28. The latter extends outwardly from the arm in the general shape of a semi-circle open at its top and comprises a plurality of spaced parallel plates 29, 30 and 31 supported in proper relation to each other as by means of studs 32 located on the arc of a semi-circle and forming with the plates 29, 30 and 31 pockets for receiving the test lenses. Studs 32 may also be extended forwardly of the pockets proper and provided with one or more grooves 33 Figure 2, forming additional lens receiving pockets. The forward plate 29 is designated in circular degrees as at 34 to indicate the angular displacement of a lens axis. Plate 29 has fixed therein a sleeve 35, Figure 2, through which extends a rotary spindle 36 having a forward finger-piece 37 and a roller 38 in one or more of the pockets for engagement with the periphery of a lens to rotarily or angularly adjust the latter, the above described pocket construction being one well known in the art and requiring no further description, further than to point out that it permits of the convenient insertion and removal of a lens and of angular adjustment of the latter as desired.

The lens pocket arm 27 has fixed to its upper portion 26 a horizontally extending arm 39 marked with a suitable scale 40 cooperating with an index 41 marked adjacent the upper end of a short bar 42 shown in Figures 4 and 6. This bar is preferably provided adjacent its ends with openings receiving the guide members 15 and 16, the bar being fixed in position on the latter as by means of pins or rivets 43 passed therethrough. The forward face of the bar is recessed as at 44 to provide a channel slidably receiving and supporting the scale arm 39. One of these bars 42 is fixed in position as described adjacent the center of each half of the bridge and not only carries the index mark 41 described, but also serves as a stop limiting the outward movement of the lens pocket heads 23 and 24 and furthermore serves to rigidly connect the guide members 15 and 16.

In order that the lens pockets may be given a fine adjusting movement on the bridge by the exertion of a comparatively light force not likely to derange the position of the frame, the sliding head 23 is preferably recessed as at 45, Figure 9, to provide a chamber for a pinion 46 fixed on a spindle 47 rotatably supported in the block and provided forwardly thereof with a finger-piece 48 by means of which the pinion may be conveniently rotated. The teeth of the latter mesh with rack teeth 49 formed in the upper side of the lower guide member 16. Finger-piece 48 may be rotated by a slight effort and produces a comparatively fine adjusting movement of the lens pockets laterally of the frame which movement is indicated by the scale 40 and index 41.

The other lens pocket 49 carried by an arm 50 depending from the head 24 on the bridge is similarly constructed and similarly adjustable laterally of the frame by a finger-piece 51 operating rack and pinion means as described above, but this pocket is preferably adjustably vertically also relative to the bridge and to the first pocket to accommodate for any difference in elevation of the patient's eyes. To this end head 24 is channeled as at 51ª to provide a bearing for the pocket arm 50 which has a vertical sliding movement therein and is continued upwardly above the bridge as at 52. Its upper end is turned rearwardly as at 53 and rotatably supports a screw 54 having a finger-piece 55 and threadedly engaging in an opening in an upwardly extending post 56 on the head 24. Arm 50 is provided with an elongated slot 57 embracing the spindle 51 and it is apparent from this construction that by turning finger-piece 55 the pocket may be given a fine vertical adjusting movement, which is indicated by a scale 58 on the arm extension 52 and a cooperating index 59 on the block. The latter has fixed thereon, as in the case of the other pocket, a scale 60 cooperating with an index 61 on a bar 62 similar to the bar 42.

The temple means are supported by and laterally adjustable in the ends of the bridge, each comprising a head 63, Figures 1 and 12, channeled at its upper and lower ends to provide bearings slidably engaging the members 15 and 16. Each head 63 is formed with a central opening in which the inner end of the temple-piece or bar 22, previously referred to, is received and secured as by means of a screw 64. The temple piece 22 extends laterally outward from its head and is slidably guided in the opening in the outer tie member 18. Beyond the end of the bridge each temple piece is preferably turned rearwardly as at 65 and thence downwardly as at 66, being provided adjacent the horizontal center line of the pocket with means pivotally supporting the temple bow, such means preferably comprising an enlarged portion 67 between which and a nut 68 on the lower end of the temple-piece is rotatably supported a sleeve 69 provided with a cheek bearing plate 70, Figure 13. Sleeve 67 is preferably formed with spaced shoulders one of which is indicated at 71, Figure 1, and the other at 72, Figure 13, and sleeves 69 has a corresponding projection 73 playing between the shoulders of the enlargement 67 so that the sleeve and attached temple bow have a horizontal swinging movement through an angle of approximately 90 degrees, to provide for folding of the bows in the usual manner. The temple bow preferably comprises extensible sections 74 and 75. Section 74 is provided with a cheek plate 76 pivotally secured as by means of a screw 77 to the cheek plate 70, to provide for a swinging movement in a vertical plane. The bow preferably carries a pawl 78, Figure 5, sliding longitudinally in lugs 79 on the bow and pressed forwardly as by means of a spring 80 to carry its bevelled forward end into engagement with a series of teeth 81 on the periphery of bearing plate 70, for maintaining the temple in the desired position of vertical adjustment.

The rear end of the bow section 74 carries a guide or keeper 82 in which the rear section 75 of the bow slides and the rear section also carries a similar keeper 83 embracing the section 74, so that the rear section 75, which is preferably suitably curved for engagement over the ear, is extensible to suit the physical conformation of the patient. One of these bow sections may be provided with a scale indicated at 84 and the other with an index 85 for indicating the position of setting and the required measurement or dimension. Keeper 83 preferably carries a spring finger 86 having an angular end 87 passing through an opening 88 in section 75 for cooperation with spaced recesses 89 in section 74, to form a detent device. It is apparent from the above description that the bows are not only adjustable laterally but also vertically as well as from front to rear in addition to the horizontal folding movement, so that they may be adjusted to position to maintain the frame in proper position on any patient.

The nosepiece is preferably supported on the bridge for adjustment in both vertical and front to rear directions by means comprising a threaded spindle 90 engaging a vertical bore in the central tie member 17. This spindle is rotatably supported at its upper end in a head or part 91 and at its lower end in a part 92, which parts are rigidly connected as by means of spaced parallel bars 93 one on either side of the threaded spindle. The latter carries a finger piece 94 at its upper end by the rotation of which vertical limb formed by the rods 93 may be given a precise vertical adjustment on the bridge member 17. The latter is preferably provided with an index mark 95 cooperating with a suitable scale 96 marked on a plate 97 secured as by means of screws 98 to the part 91 and having a rearwardly turned lower end 99 embracing the rods 93. The lower part 92 is somewhat enlarged and formed with bearings in which are slidably received spaced parallel rods 100. Fixed at the forward ends of the latter is a connecting head or part 101 and at their rear ends a part 102 on which latter a nosepiece 103 of any suitable description is pivoted as at 104. Fixed at its forward end on part 101 is a plate 105 having a downwardly turned rear end 106 secured to the forward side of part 102. This plate is marked with a suitable scale $106^a$ cooperating with an index 107 on the part 92 which of course is formed with an opening slidably receiving the plate 105. Rotatably supported in part 101 and in the downturned rear end 106 of plate 105 is a spindle 108 threadedly engaging an opening in part 92, the spindle having a forward finger-piece 109 by means of which it may be rotated to adjust the nosepiece 103 from front to rear, which adjustment is indicated by the scale $106^a$ and index 107.

It is apparent from the above description that the temple bows may be extended or contracted laterally of the bridge and adjusted vertically as well as in length and the latter adjustment is conveniently indicated by the scale 84. After such lateral adjustment the bows may be securely clamped in position by turning the finger-pieces 21 of the screws at the outer ends of the bridge. By turning finger-piece 94 above the center of the bridge the nosepiece may be adjusted vertically, and by turning finger-piece 109 it may be adjusted from front to rear, both of which adjustments are indicated by suitable scale means. These various adjustments are quickly and conveniently made and serve to support the frames in correct position on any patient's head. After such adjustment of the frame the lens pockets may be independently adjusted laterally of the frame by turning the finger-pieces 48 and 51, and they may also be adjusted vertically relative to each other by turning the finger-piece 55, all of these adjustments being indicated by the scale means described. The trial lenses may thus be properly positioned and centered relative to the eye and the various adjustments all read from the indicating means at one setting. The adjusting parts are largely elevated in a plane well above the line of sight for convenience in adjusting the same without interference with the vision.

As shown in the drawings the frame is to a large extent constructed of rod or wire members which may be tubular in form if so desired, thus providing for a light and economical form of structure. The remaining parts are likewise of a comparatively light construction consistent with the rigidity necessary for durability and accuracy and it is apparent that the various part may be manufactured and assembled in the form shown at a comparatively low cost.

I claim as my invention:

1. In an ophthalmic test lens frame, a bridge comprising a pair of parallel bars connected adjacent their centers and ends, inner and outer heads slidably supported for independent movement upon the bars on each side of their central portion, temple members carried by the outer heads, lens supporting elements depending from each of the inner heads, one of said elements being vertically adjustable upon its head, separate operating members engaging the last mentioned head one of which is adapted to move the head upon the guides and the other to move the adjustable lens supporting element upon said head and a nose piece carried by the bridge.

2. In an ophthalmic test lens frame, a bridge comprising a pair of parallel guides connected adjacent their centers and ends, one of the guides having a rack on each side of its central connection, heads independently slidably upon the opposite guide, pinions carried by said heads and adapted to travel upon said racks to effect independent adjustment of the heads, lens holding elements carried by said heads, one of said elements being adjustable upon its head, a nose piece supported by the bridge and temple means including bars extending longitudinally between said parallel guides and having heads on their inner ends independently adjustable upon the guides.

3. In an ophthalmic test lens frame, a bridge comprising parallel guide bars, tie members connecting said bars in spaced relation at their central and end portions, a pair of heads slidably supported between said bars on each side of said central portion, an arm depending from one of the heads of each pair, an upwardly opening lens pocket on each arm, a temple piece fixed to the other head of each of said pairs and slidably supported in said end tie members, and a nosepiece adjustably carried by the central tie member.

4. In an ophthalmic test lens frame, a bridge comprising parallel guide bars, tie members connecting said bars in spaced relation at their central and end portions, a pair of heads slidably supported between said bars on each side of said central portion, an arm depending from one of the heads of of each pair, a lens pocket on each arm, means for independently adjusting and indicating the positions of said lens pocket heads, a temple piece fixed to the other head of each of said pairs and slidably supported in the corresponding end tie member, and a nosepiece adjustably carried by the central tie member.

5. In an ophthalmic test lens frame, a bridge comprising parallel guide bars, tie members connecting said bars in spaced relation at their central and end portions, a pair of independently movable heads slidably supported between said bars on each side of said central portion, an arm depending from one of the heads of each pair, a lens pocket on each arm, means for independently adjusting and indicating the positions of said lens pocket heads, a device for adjusting and indicating the vertical position of one of said lens pockets, a temple piece fixed to the other head of each of said pairs and slidably supported in the corresponding end tie member, and a substantially vertical limb adjustably carried by the central tie member and provided with a nosepiece.

6. In an ophthalmic test lens frame, a bridge comprising parallel guide bars, tie members connecting said bars in spaced relation at their central and end portions, a pair of independently movable heads slidably supported between said bars on each side of said central portion, an arm depending from one of the heads of each pair, a lens pocket on each arm, independent rack and pinion means for laterally adjusting the positions of said lens pocket heads and means for indicating the positions of adjustment thereof, a device for adjusting and indicating the vertical position of one of said lens pockets on its head, a temple piece fixed to the other head of each of said pairs and slidably supported in the corresponding end tie member, a temple bow pivotally supported for vertical movement on the outer end of each temple piece, and a substantially vertical limb adjustably carried by the central tie member and provided with a nosepiece adjustable thereon from front to rear of the frame.

7. In an ophthalmic test lens frame, a bridge including a pair of parallel guides and tie members therefor adjacent the ends thereof, temple bars adjustable on said guides and extending longitudinally therebetween and through said tie members, a pair of arms slidably disposed upon the bridge, a lens support on each arm and a nosepiece carried by said bridge.

CLARENCE M. STEVENSON.